United States Patent
Adamis et al.

[11] Patent Number: 5,168,772
[45] Date of Patent: Dec. 8, 1992

[54] CAMSHAFT ARRANGEMENT AND METHOD FOR PRODUCING IT

[75] Inventors: Panagiotis Adamis, Wolfsburg; Ralf Oppel, Cologne, both of Fed. Rep. of Germany

[73] Assignee: Volkswagen AG, Fed. Rep. of Germany

[21] Appl. No.: 640,915

[22] Filed: Jan. 11, 1991

[30] Foreign Application Priority Data

Jan. 11, 1990 [DE] Fed. Rep. of Germany ....... 4000651

[51] Int. Cl.⁵ .............................................. F16H 53/00
[52] U.S. Cl. ................................. 74/568 R; 74/567; 123/90.6; 123/90.17
[58] Field of Search ............... 74/567, 568 R, 569; 123/90.6, 90.17, 90.18

[56] References Cited

U.S. PATENT DOCUMENTS

| | | | |
|---|---|---|---|
| 4,498,352 | 2/1985 | Hedelin | 74/568 R |
| 4,790,271 | 12/1988 | Onda | 74/568 R |
| 4,870,872 | 10/1989 | Parsons | 123/90.17 X |
| 4,872,428 | 10/1989 | Mitchell | 74/568 R |
| 4,886,022 | 12/1989 | Nakai | 74/567 X |
| 4,977,793 | 12/1990 | Husted | 120/90.6 |

FOREIGN PATENT DOCUMENTS

| | | | |
|---|---|---|---|
| 3234640 | 3/1984 | Fed. Rep. of Germany | 74/568 R |
| 0058260 | 4/1984 | Japan | 74/568 R |
| 1288413 | 2/1987 | U.S.S.R. | 74/568 R |
| 2233734 | 1/1991 | United Kingdom | 74/567 |

*Primary Examiner*—Vinh T. Luong
*Attorney, Agent, or Firm*—Brumbaugh, Graves, Donohue & Raymond

[57] ABSTRACT

A camshaft has a cam arrangement with a projection and recess coupling the camshaft with a cam member which permits limited relative angular motion between them. The cam arrangement includes a hollow cylinder affixed to the shaft with a projection received in a recess in the cam member. The cam member and the hollow cylinder are held together by rings at their end faces into a pre-assembled unit which is slid on and affixed to the camshaft.

3 Claims, 1 Drawing Sheet

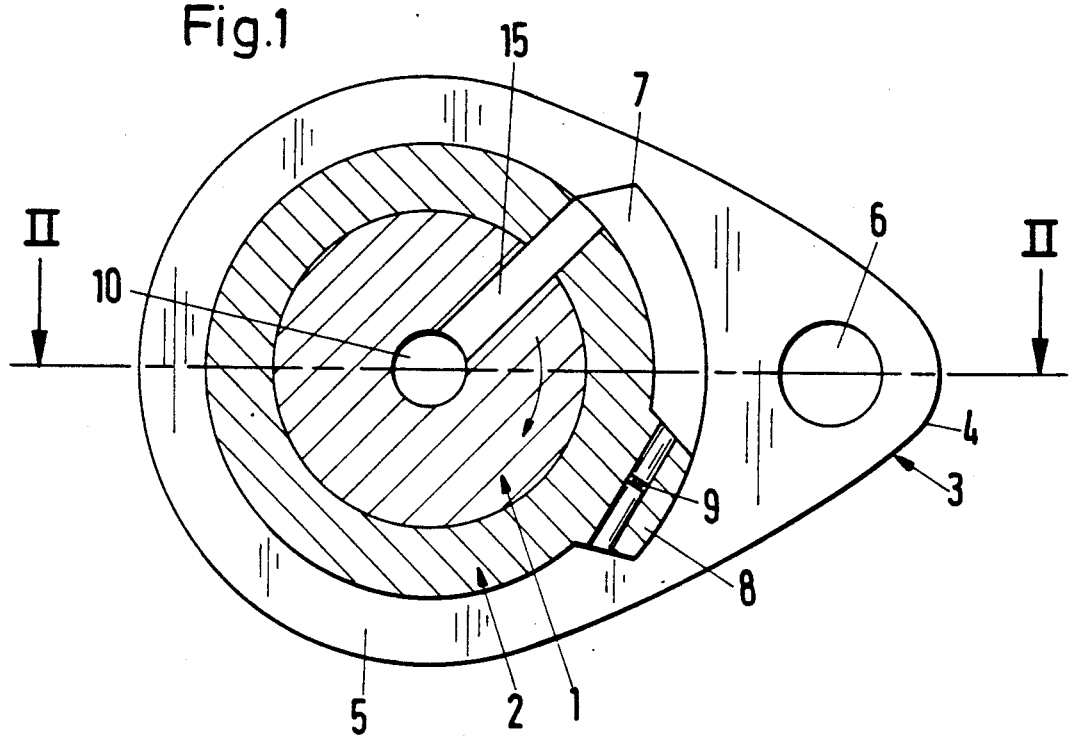
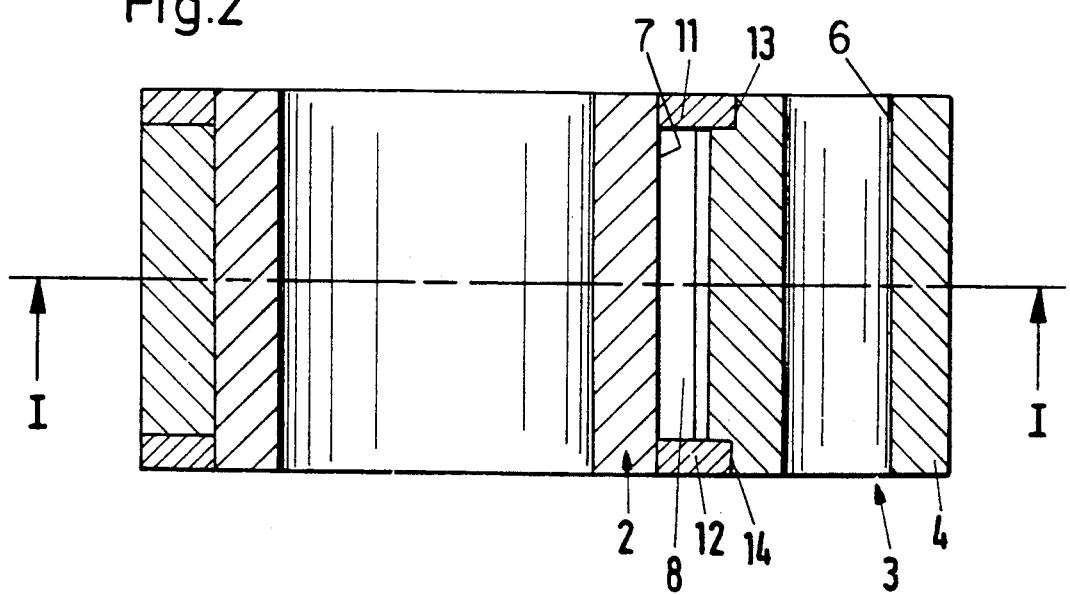

5,168,772

CAMSHAFT ARRANGEMENT AND METHOD FOR PRODUCING IT

BACKGROUND OF THE INVENTION

This invention relates to camshafts having cams supported for limited rotation thereon and to methods for producing such camshafts.

In German Offenlegungsschrift No. 32 34 640, a camshaft having cams mounted for limited rotation thereon utilizes in an advantageous manner forces which inevitably occur during valve operation, such as inertial forces and the closing force of the valve-closing spring and which are dependent on the revolutions per minute, to produce a change in the valve operation time which is dependent on the rpm. This is often desirable for the control of gas intake and exhaust valves, particularly for automotive internal combustion engines.

The arrangement described in that publication is designed so that the cam has a sleeve-shaped area supported directly on the camshaft and one component of a limited angular motion coupling between the camshaft and the cam, preferably a dog-like projection, is mounted on the camshaft. In the described arrangement, the dog-like projection is provided by a strip mounted in a recess in the camshaft.

To modify the gradient of the valve lift curve produced by this camshaft arrangement, a damper is provided. The damper consists of a throttle bore in the dog-like projection and a hydraulic fluid in a cam recess which receives the projection and permits limited angular motion of the projection therein. The damping fluid can be supplied to the recess through a flap valve from a longitudinal bore in the camshaft.

SUMMARY OF THE INVENTION

Accordingly, it is an object of the present invention to provide a new and improved camshaft arrangement of the above type and method for producing it which eliminate disadvantages of the prior art.

Another object of the invention is to provide a camshaft arrangement of the above type which is simple to manufacture while retaining advantageous properties regarding the damping effect on the valve lift curve.

These and other objects of the invention are attained by providing a cam arrangement including a hollow cylinder disposed between the camshaft and the cam, which is supported for limited angular motion thereon in which the hollow cylinder is fixed against relative rotation on the camshaft. To provide end walls for a dog-receiving recess in the cam, rings are provided at the end faces of the hollow cylinder and the cam.

Since the incorporation into the camshaft of one of the two components of the limited angular motion coupling, i.e., the dog or the recess associated with it, is avoided in accordance with the invention and an additional hollow cylinder is used instead, the invention permits consolidation of all of the parts of the cam arrangement other than the shaft into a pre-assembled unit. The assembled unit is then slid onto the shaft and the hollow cylinder is affixed to it by any conventional procedure, such as soldering, gluing, shrinking, screwing or the like. If desired, this pre-assembled unit may be filled with a damping medium. However, it is also possible to provide a longitudinal conduit in the camshaft and a lateral conduit in the shaft and in the hollow cylinder to supply the recess in the cam arrangement with a damping medium.

BRIEF DESCRIPTION OF THE DRAWINGS

Further objects and advantages of the invention will be apparent from a reading of the following description in conjunction with the accompanying drawings in which:

FIG. 1 is a cross-sectional view, taken on a line I-I of FIG. 2, illustrating a representative embodiment of a camshaft arranged according to the invention; and FIG. 2 is a view in longitudinal section through the cam arrangement taken along the line II-II in FIG. 1 and looking in the direction of the arrows.

DESCRIPTION OF PREFERRED EMBODIMENTS

In the typical embodiment of the invention shown in the drawings, a shaft 1 which, as a rule, will be associated with a plurality of cam arrangements, supports a hollow cylinder 2 on which a cam member 3 is mounted. In addition to having a projection with a cam surface 4, the cam member 3 includes a sleeve-shaped portion 5 through which the shaft 1 extends. The cam projection having the cam surface 4 may be formed with a hole 6 to reduce the mass of the projection.

The hollow cylinder 2 is supported against relative rotation on the shaft 1 in any conventional way. Between the cam member 3 and the hollow cylinder 2, a limited angular motion connection is defined by a recess 7 extending in the angular direction. The recess 7, together with a dog-like projection 8 extending into it, form a coupling providing limited angular relative motion between the cam member 3 and the shaft 1. Assuming the shaft 1 rotates in the direction indicated by the arrow in the drawing, the projection 8 engaging one end of the recess 7, as shown in the drawing, drives the cam member 3 in the same direction as it rotates. A valve lifter of conventional type, and thus not shown, lifts an associated valve into the open position when the surface 4 of the cam projection comes into contact with the valve lifter.

As soon as the crown of the cam surface 4 passes the valve lifter, the force of a conventional valve-closing spring associated with the valve lifter drives the cam member 3 in the direction of the arrow faster than the rotation of the shaft 1 and the cylinder 2. This overtaking motion continues until the projection 8 engages the opposite end of the recess 7. In the exemplary embodiment shown in the drawings, this relative angular motion of the cam 3 on the cylinder 2 is damped by a throttle bore 9 which restricts displacement of fluid from one end of the recess 7 to the other. This action of the camshaft arrangement, as also described in detail in the above-mentioned German Offenlegungsschrift No. 32 34 640, produces a valve closing rate which is dependent on the rpm of the engine.

It should be added here that it is obviously also possible to arrange a dog-like projection 8 on the inside of the cam member 3 and, accordingly, form a recess 7 in the outer surface of the hollow cylinder 2 to provide a limited relative angular motion coupling between those components.

The recess 7 is supplied with a hydraulic pressure medium through two conduits 10 and 15 from the engine which, in cooperation with the throttle bore 9, provides the damping action described above.

The recess 7 is laterally sealed at both ends by two rings 11 and 12 which extend into corresponding recesses 13 and 14 in the end surfaces of the cam member 3 and together provide sealing for the hydraulic fluid.

As previously mentioned, FIG. 2 illustrates those components of the camshaft arrangement which have been combined into a pre-assembled unit. After assembly, the components are held together by the rings 11 and 12 which have been pressed on the cylinder or press fitted in the recesses 13 and 14 from the direction of the end faces. This pre-assembled unit then is slid onto the shaft 1 along with other units of this type, if desired, and then fixed on it, providing a camshaft which is very easy to manufacture.

Thus, a camshaft arrangement has been provided by the invention which is distinguished by a particular ease of assembly.

Although the invention has been described herein with reference to specific embodiments, many modifications and variations therein will readily occur to those skilled in the art. Accordingly, all such variations and modifications are included within the intended scope of the invention.

We claim:

1. A camshaft arrangement comprising a shaft, at least one cam arrangement mounted on the shaft, the cam arrangement including a cam member supported for limited angular motion with respect to the shaft, the cam arrangement further including a hollow cylinder affixed to the shaft, and a coupling between the hollow cylinder and the cam member defining the extent of limited angular motion including a recess and a dog-like projection which is received with angular play in the recess, and a ring at each end surface of the cam arrangement to retain the hollow cylinder and the cam member together and provide end surfaces for the recess.

2. An arrangement in accordance with claim 1 wherein the rings provide seals for fluid in the recess.

3. An arrangement in accordance with claim 1 or claim 2 wherein the rings are received in cavities formed in the end surfaces of the cam member.

* * * * *